United States Patent [19]

Brand et al.

[11] Patent Number: 5,110,294

[45] Date of Patent: May 5, 1992

[54] DEVICE FOR GROUND-BASED SIMULATION OF OPERATIONS OF A MANIPULATOR USABLE IN SPACE BY MEANS OF A MODEL OF A SPACE VEHICLE

[75] Inventors: Bernd Brand; Ernst-Ludwig Klingelhofer, both of Gilching; Kristiane Hoch, Hamburg, all of Fed. Rep. of Germany

[73] Assignee: Deutsche Forschungsanstalt fur Luft -und Raumfahrt e.V., Cologne, Fed. Rep. of Germany

[21] Appl. No.: 587,129

[22] Filed: Sep. 24, 1990

[30] Foreign Application Priority Data

Sep. 22, 1989 [DE] Fed. Rep. of Germany ....... 3931753

[51] Int. Cl.$^5$ .............................................. B64G 7/00
[52] U.S. Cl. ...................................... 434/34; 73/865.6
[58] Field of Search ................... 434/34; 212/205, 210; 73/865.6; 272/24, 36–40

[56] References Cited

U.S. PATENT DOCUMENTS

1,426,536  8/1922  Bateman .......................... 212/210
3,161,968 12/1964  DeBoy et al. .......................... 434/34
3,281,964 11/1966  Hewes ................................ 434/34
3,516,179  6/1970  Dane ................................. 434/34

Primary Examiner—Richard J. Apley
Assistant Examiner—Glenn E. Richman
Attorney, Agent, or Firm—Browdy and Neimark

[57] ABSTRACT

In a device for the ground-based simulation of operations capable of being performed in the direction of or around the three axes of an orthogonal coordination system of a manipulator usable in space by a model of a space vehicle, easily movable carriages are each guided in rails extending in the y-direction and disposed on a horizontal support frame, and a deflection roller is disposed on each, over which are guided ropes fastened with one free end on opposite sides of at least one segment of a simulated manipulator, in fact laterally offset in respect to the longitudinal segment axis and the center of gravity of the segment. Furthermore, the ropes are fastened, following an appropriate guidance over a plurality of deflection rollers and associated counterweights, with their other ends on the associated carriage. To simulate a rotation of the manipulator in respect to the mock-up around the z-axis extending through the manipulator base point, the mock-up is rotatable by a drive system in respect to the simulated manipulator around the z-axis extending through its base.

19 Claims, 9 Drawing Sheets

DEVICE FOR GROUND-BASED SIMULATION OF OPERATIONS OF A MANIPULATOR USABLE IN SPACE BY MEANS OF A MODEL OF A SPACE VEHICLE

FIELD OF THE INVENTION

The invention relates to a device for the ground-based simulation of operations capable of being performed in the direction of or around the three axes of an orthogonal coordination system of a manipulator usable in space by means of a model (mock-up) of a space vehicle.

BACKGROUND OF THE INVENTION

Up to now, two-dimensional simulation has been used for the display of the movement, including the dynamics, of the actual space vehicle in a selected plane, for example in connection with the Flat Floor Facility for the "Remote Manipulator System" (RMS; RMS is the designation for the manipulator used by the NASA Space Shuttle for manipulating payloads in orbit). However, the limitation of this simulation to planar movement sequences is disadvantageous, so that no realistic simulation of operations in space is possible.

To the extent known by applicant, NASA is said to use a model of the RMS adapted to gravity for the purpose of three-dimensional simulation. But with such a model, deviations in respect to the original geometry and dynamics of the structures and drives is unavoidable and must therefore be considered to be disadvantageous.

Theoretically, three-dimensional simulation would also be possible with a water tank of a size between $10^3$ and $10^4$ m$^3$; besides the size of the water tank, the operational range would be hard to observe with this solution. Also a particular adaptation of the manipulator and the mock-up to underwater operation, i.e. its encapsulation, would be necessary. A considerable resistance to movement would additionally have to be overcome.

Furthermore, MBB/ERNO has proposed in a study a three-dimensional relation model with a simple central rope suspension. But there is no freedom of moment in several manipulation joints of such a manipulation system, because only one rope guidance has been provided; furthermore, there are severe restrictions of the kinematics because of the central rope suspension.

In a further study of MBB/ERNO, a cantilevered simulation model has been proposed, the joints and structure of which have been reinforced. The disadvantage with this model lies in that the simulation model greatly differs in its geometry from the original of the manipulator and therefore considerable kinematic restrictions are the result.

Furthermore, with this model it is not possible to simulate, for example, an operation planned for the HERA manipulator of the HERMES transport system, namely the so-called walk-over from the HERMES transport system to the freely orbiting Columbus laboratory, because of the heavy drives for the joints at the manipulator base, which are of an order of magnitude of 500 kg, compared with 20 kg at the end effector. The reason is that in connection with the required walk-over of the manipulator, a functional change of base and end effector takes place. This means that after the walk-over the former end effector represents the manipulator base and the former base is now the end effector. For this reason the HERMES manipulator HERA has been completely symmetrically constructed.

SUMMARY OF THE INVENTION

While avoiding the disadvantages of the simulation systems thus far used and proposed, it is therefore an object of the invention to provide a device for the simulation on the ground of the operation of manipulators which can be used in space in such a way that a simulation in all three spatial dimensions can be performed with as negligible as possible restrictions of the geometric, kinematic and kinetic marginal conditions present with the original.

This object is attained in accordance with the present invention in a device for the ground-based simulation of operations of a manipulator usable in space by means of a model (mock-up) of a space vehicle wherein a horizontally disposed support frame is provided for the support of preferably two rails extending in the y-direction, on which run easily movable carriages each supporting a deflection roller over each one of which a rope is guided, where the two ropes are fastened with one free end on two different segments of a simulated manipulator and are laterally offset in respect to the respective longitudinal axis of the segment and of the respective center of gravity of the segment on opposite sides of the two segments exactly under the respective deflection roller, and are fastened with their other ends, after having been correspondingly guided over further deflection rollers and an associated counterweight, each with approximately twice the weight of the manipulator segment, which is to be relieved, on the associated carriage; and that for simulating a rotation by means of a drive system of the manipulator in respect to the mock-up around the z-axis extending through the manipulator base point the mock-up is rotatable in respect to the simulated manipulator around the z-axis extending through the manipulator base.

In the devices according to the invention, the weight compensation of at least one segment is achieved by means of the linkage of support and guy ropes, which are laterally offset from the center of gravity of the segment and attached on opposite sides. In contrast to a non-supported segment, torque caused by gravity, which must be provided by the drive of the respective joint, is eliminated to a large degree or at least minimized to a large extent. A torsional or bending moment, caused by the laterally offset rope linkage and thus by the eccentricity of the supports, must thus be only taken up by the shaft of the joint and must not he provided by the motor.

If in the devices according to the invention two segments are relieved by linkages on the two segments, which are laterally offset in respect to the corresponding longitudinal segment axis and the corresponding center of gravity of the segment, the twisting caused by torsion and appearing at the end effector of the manipulator is advantageously compensated to a large degree. Furthermore, the linkages on the two manipulator segments are not in each others' way, because of being fixed on different sides of the two segments.

It is furthermore possible with the devices according to the invention to simulate in an advantageous manner and without problems the walk-over from, for example, the planned HERMES transport system to the freely orbiting COLUMBUS laboratory. It is possible to satisfy without difficulty the increased demands made on the kinematics, which result from the change of the base point of the manipulator during the walk-over. Because gravity and in particular the static moments are compensated to the greatest degree possible or have at least been greatly minimized, it is possible to provide and utilize appropriately weak joint drives even in the joints close to the base. This is of great importance, because in the course of walk-over the functions of joints close to the base are being transferred to joints close to the effector, which can only absorb small moments.

In contrast to the systems used or proposed up to now, the devices according to the invention in which the weight of manipulator segments is completely compensated essentially have the following advantages; The moment generated by the effects of gravity, which must be raised by the joint drives, is being completely compensated at the balanced segments. Furthermore, collision between the manipulator and a rope are prevented to the greatest extent possible because of the eccentric rope linkage, and these are even theoretically impossible. Furthermore, in connection with a simulation by means of the devices according to the invention, it is even possible to use hardware which in respect to its structure and to the joint drives is identical to that used in space. Furthermore, a simple and thus cost-effective adaptation to different types of manipulators is possible by an exchange of counterweights.

BRIEF DESCRIPTION OF DRAWING

The invention will be described below by means of preferred embodiments and by referring to the attached drawings.

DETAILED DESCRIPTION OF EMBODIMENTS

Figure 1:
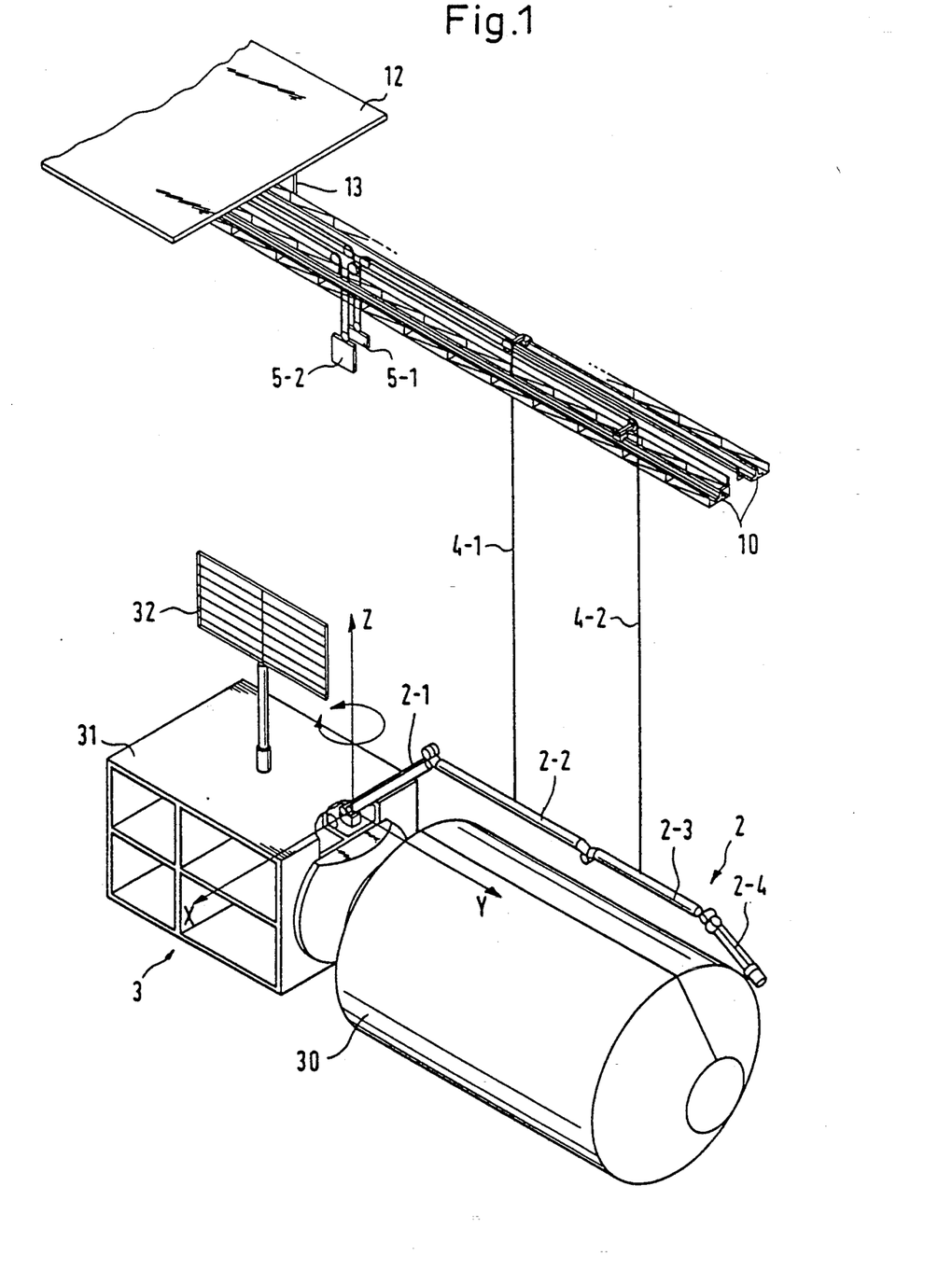
FIG. 1 is a schematic view of a first embodiment of a simulation device with a support frame, a manipulator and a model of a space vehicle (mock-up)
Figure 2A:
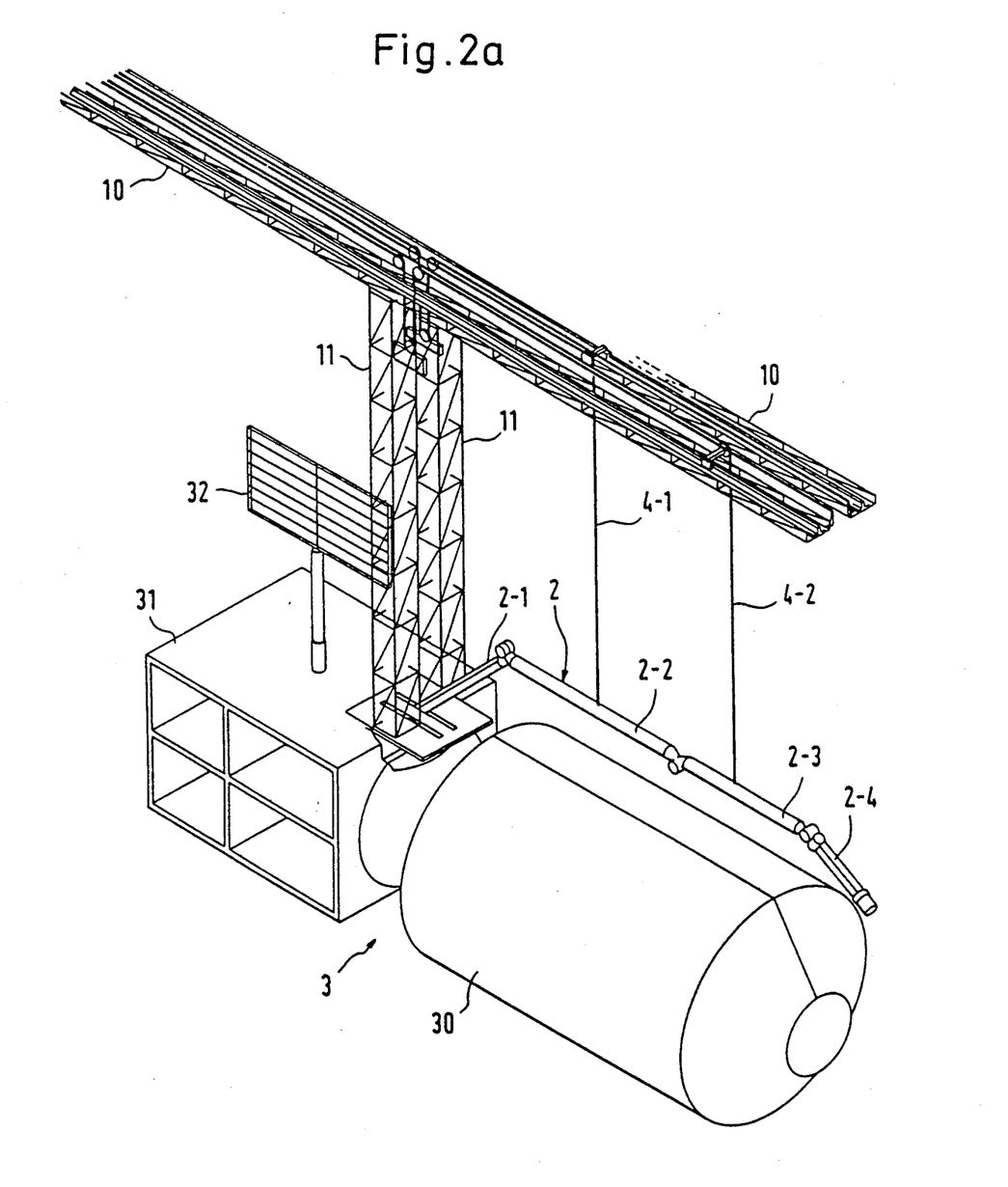
FIG. 2a is a schematic view corresponding to FIG. 1 of a second embodiment of a simulation device with a support frame disposed on a vertical grid structure.

A so-called mock-up 3 is shown in each of FIGS. 1 and 2a, which consists of a mock space vehicle 30 docked at a mock supply module 31 provided with a part supporting solar cells as well as an antenna arrangement 32. Furthermore, a manipulator 2, is supported by means of a segment 2-1 on a false bottom 33 (see FIG. 3) in a way which will be described in detail below in connection with FIG. 3.

Figure 2B:
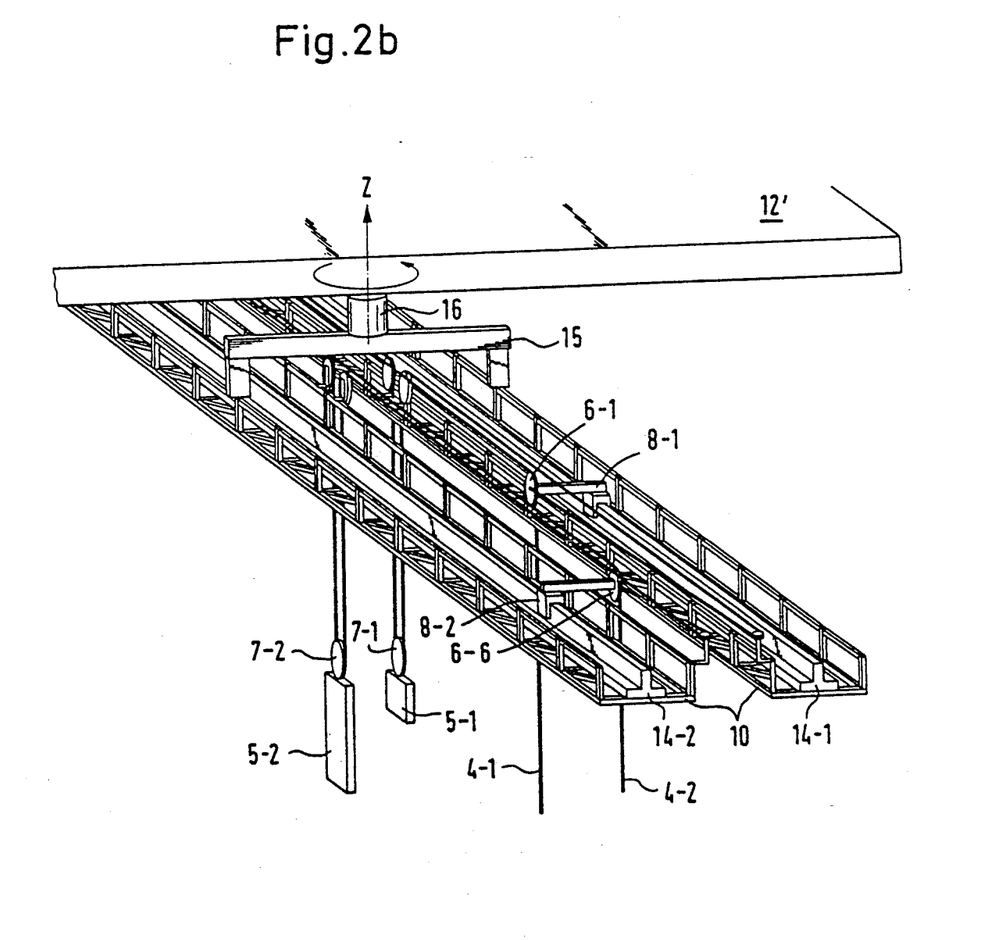
FIG. 2b is a schematic view corresponding to FIG. 2a of a still further embodiment of a simulation device with a support frame rotatable around the z-axis.

Schematically indicated support frames 10 with rails 14-1 and 14-2 (see FIGS. 3 and 4) are provided over the mock-up 3. In FIG. 1, the support frames 10 are fastened to a schematically indicated ceiling 12 by means of a suspension 13. In comparison, two support frames 10 shown in FIG. 2b are connected, for example by means of a support strap 15, which in turn is supported on a support structure 12' via an intermediate element 16 in such a way that the two support frames 10 are rotatable around the z-axis. In contrast hereto, the support frames 10 in FIG. 2a are fastened to the upper end of a vertical grid structure 11, the base of which is fastened on the false floor 33 (see FIG. 3) of the supply module 31.

In accordance with the orthogonal coordinate system indicated in FIG. 1 with x-, y- and z-axes, each of which is offset by 90° from the other, the support frames 10 with the rails 14-1 and 14-2 attached thereto extend horizontally in the direction of the y-axis, while the grid structure 11 shown in FIG. 2a extends in the vertical direction, i.e. in the direction of the z-axis.

To simulate a rotation of the manipulator 2 in respect to the mock-up 3, in the embodiment in accordance with FIG. 1 the mock-up 3 is rotated around the z-axis which extends through the manipulator base, not indicated in detail. It is also possible to simulate other freedom of motion of the manipulator base possibly required during the subsequent operation of the simulator, for example a translational displacement in the direction of the y-axis or a rotation around the longitudinal axis of the mock-up, in a simple manner by means of a relative movement of the mock-up 3.

By comparison, in the embodiment in accordance with FIG. 2a the assembly consisting of the grid structure 11 and the support frame 10 fastened on the upper end of the grid structure, including the simulated manipulator 2, is turned in relation to the entire mock-up 3 around the z-axis, which extends in the vertical direction in FIG. 1. In this case the distance between the horizontally extending support frame(s) 10, which in the device in accordance with the invention support the essential part of the mechanism, and the manipulator base, i.e. the structural height of the grid structure 11 above the mock-up 3, is determined by the maximum height which can be attained by the linkage point located farthest away from the manipulator base. In the embodiment in accordance with FIG. 2b, the support frames 10 are rotatably supported in respect to the support structure 12' by means of the intermediate element 16 disposed on the support strap 15 in such a way, that the support frames 10, which are connected with each other, can each be positioned exactly above the manipulator 2 rotating around the z-axis. The possible rotational movements around the z-axis of the embodiments in accordance with FIGS. 1, 2a and 2b are indicated by an open circle in FIGS. 1 and 2b, clockwise or counterclockwise rotational movements being indicated by the arrow heads drawn in at the free end of the open circle.

Figures 9, 10:
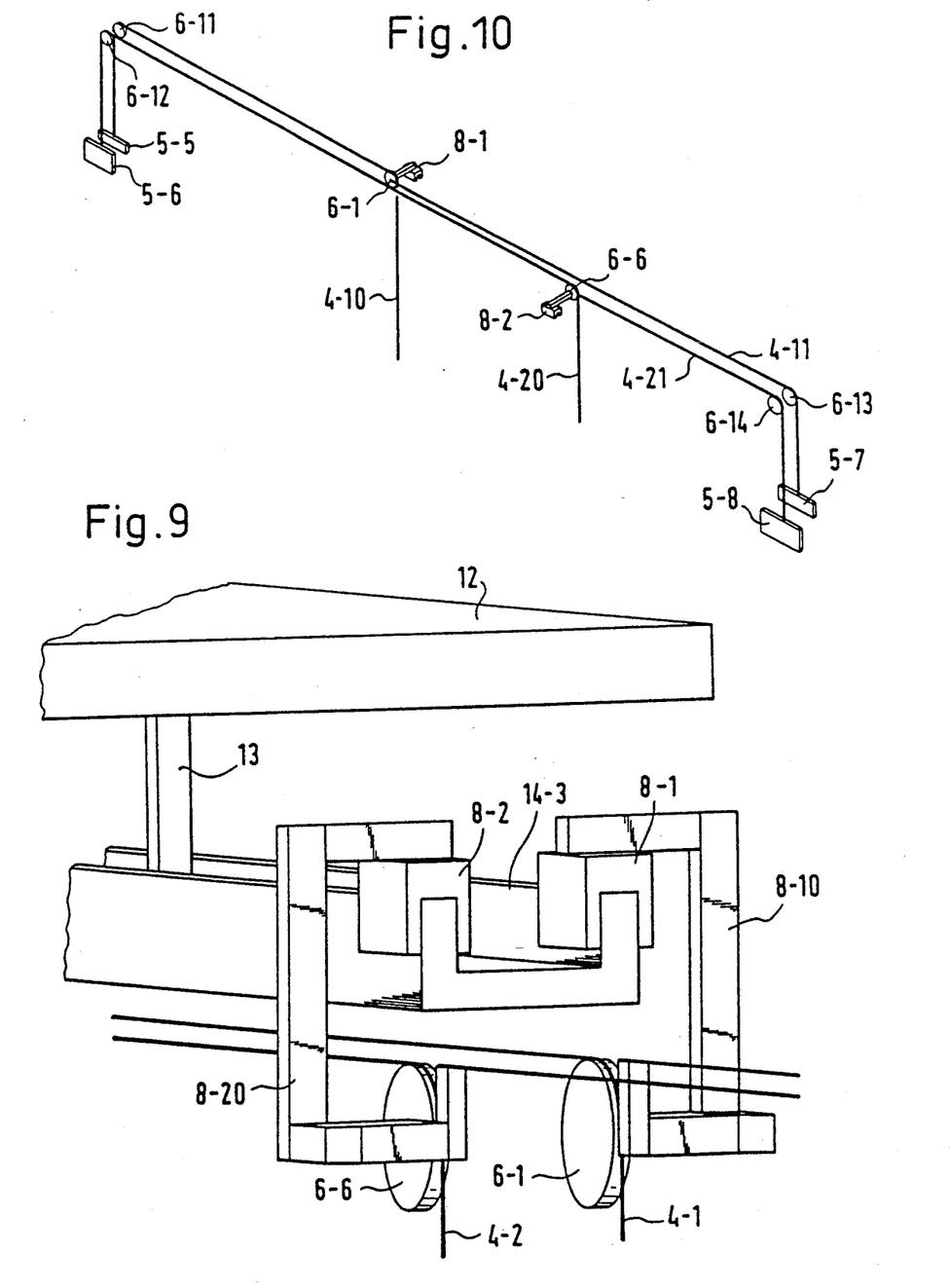
FIG. 9 is a modification of the details B and C shown in FIGS. 3 and 4 with a linkage free of moment in an enlarged view.
FIG. 10 is a schematic view in accordance with a further embodiment of the device in accordance with the invention.

As shown in FIG. 2b, the carriages 8-1 and 8-2 are guided on the rails 14-1 and 14-2 disposed on the support frames 10 in an easily movable manner, i.e. as friction-free as possible. A modification for the guidance of the carriages 8-1 and 8-2 by means of a rope linkage free of moment in relation to a U-shaped rail 14-3 is shown in FIG. 9. In this case the deflection roller 6-1 as well as 6-6, seated parallel to the x-axis, are supported on support elements 8-10 or 8-20, which have seen from the front an approximate C-shape, in such a way that the deflection rollers 6-1 and 6-6 are disposed exactly vertically under the associated carriages 8-1 and 8-2. Positioning of the deflection rollers 6-1 and 6-6 exactly above linkage points, not shown, on the associated manipulator segments, for example the segments 2-2 and 2-3, takes place by means of the actively or passively movable carriages 8-1 and 8-2.

Figure 3:
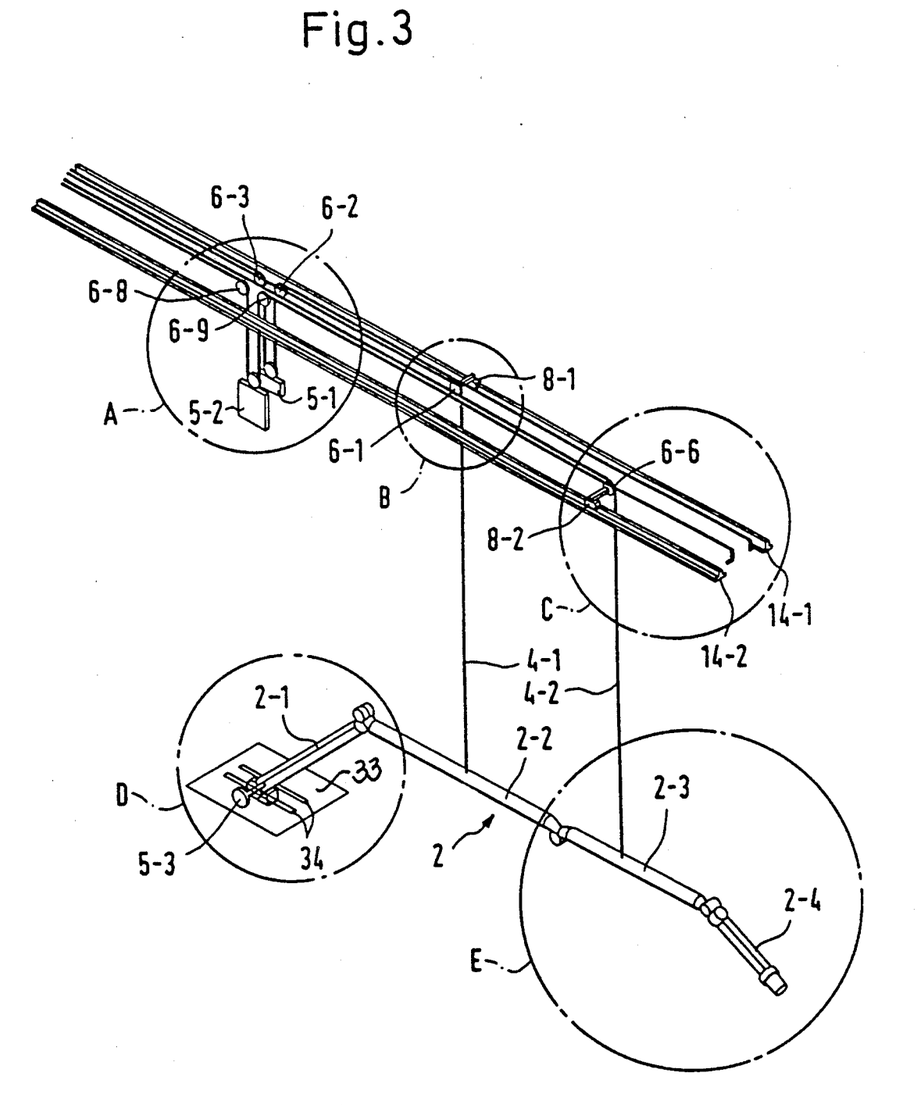
FIG. 3 is a schematic view of essential parts of the device according to the invention, together with the manipulator schematically illustrated in FIGS. 1 or 2.
Figure 4:
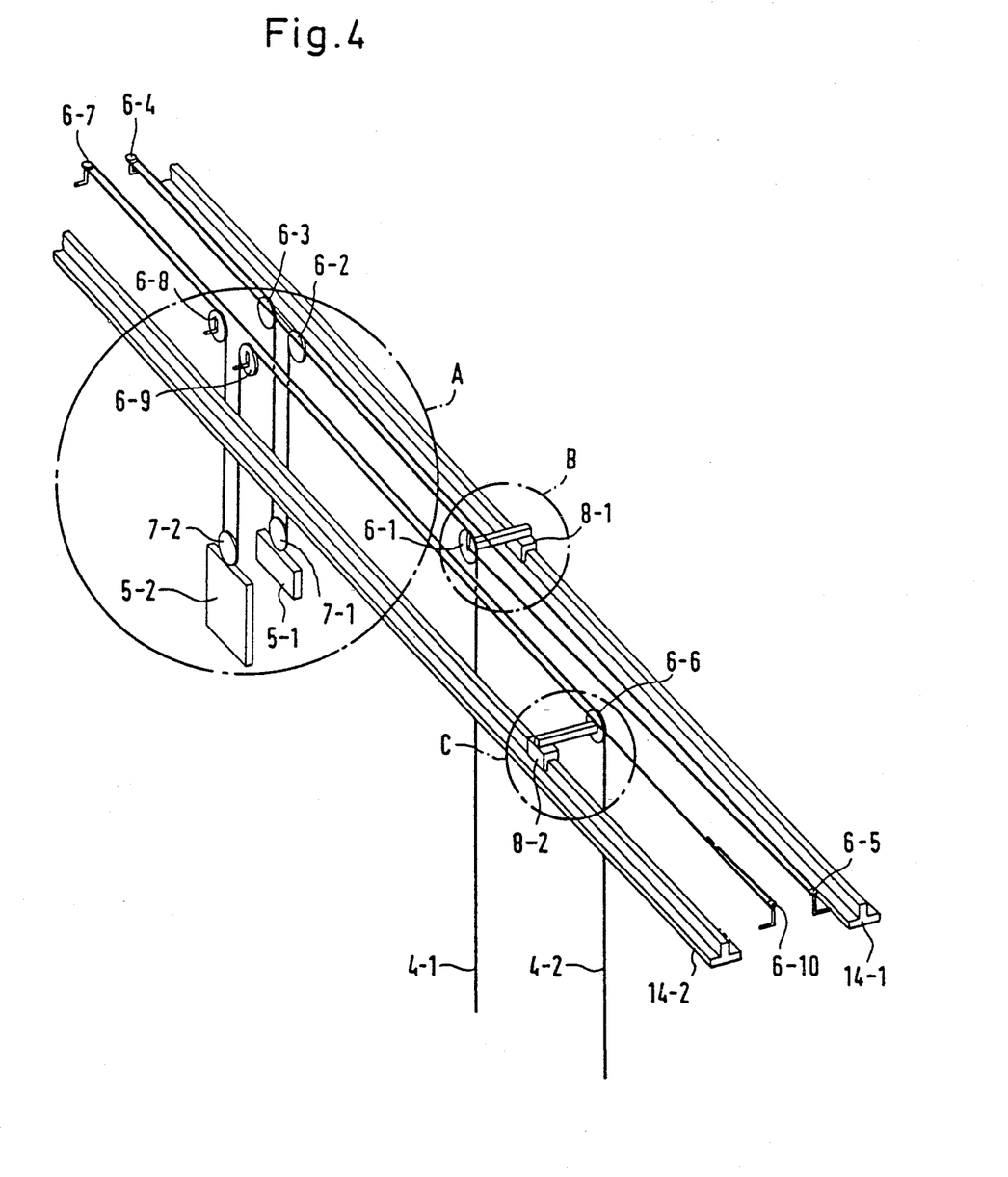
FIG. 4 is an enlarged schematic view of the sections of the device according to the invention indicated with A to C in FIG. 3.

As can be seen in detail in FIG. 3 and particularly in FIG. 4, deflection rollers 6-1 or 6-6 are rotatably supported on the two carriages 8-1 and 8-2. Ropes 4-1 or 4-2, one end of which is fastened to the segments 2-2 or 2-3 of the manipulator 2, are guided over the deflection rollers 6-1 and 6-6. The ropes 4-1 and 4-2 run over deflection rollers 6-4 or 6-7, rotatably supported on the ends of the support frames 10 parallel to the z-axis, then continue over deflection rollers 6-3 or 6-8, seated parallel to the x-axis and fastened near the center of the support frame, then over deflection rollers 7-1 or 7-2, each of which is seated parallel to the x-axis and correspondingly supported on counterweights 5-1 or 5-2, over further deflection rollers 6-2 or 6-9, seated parallel to the support frame and supported near the center of the support frame, as well as over deflection rollers 6-5 or 6-10, seated parallel to the z-axis at the other end of the support frames 10, back to the carriage 8-1 or 8-2, on which the other ends of the ropes 4-1 or 4-2 have been fastened.

As shown in FIGS. 1, 2a and 3, the ropes 4-1 or 4-2 are attached laterally offset in respect to the respective longitudinal segment axis, not shown, and thus laterally in respect to the center of gravity of the segment, also not shown, exactly vertically under the associated deflection roller 6-1 or 6-6 on different sides of the segments 2-2 or 2-3 of the manipulator 2. To compensate for the weight of the individual segments 2-2 and 2-3, the counterweights 5-1 or 5-2 are constructed in such a way that they correspond to approximately twice the weight of the respective manipulator segments 2-2 and 2-3 which they are intended to relieve. To avoid unwanted oscillation of the counterweights 5-1 and 5-2 in the xy-plane, they are preferably extended in the direction of the z-axis, i.e. in a vertical direction.

Figures 5, 6A:
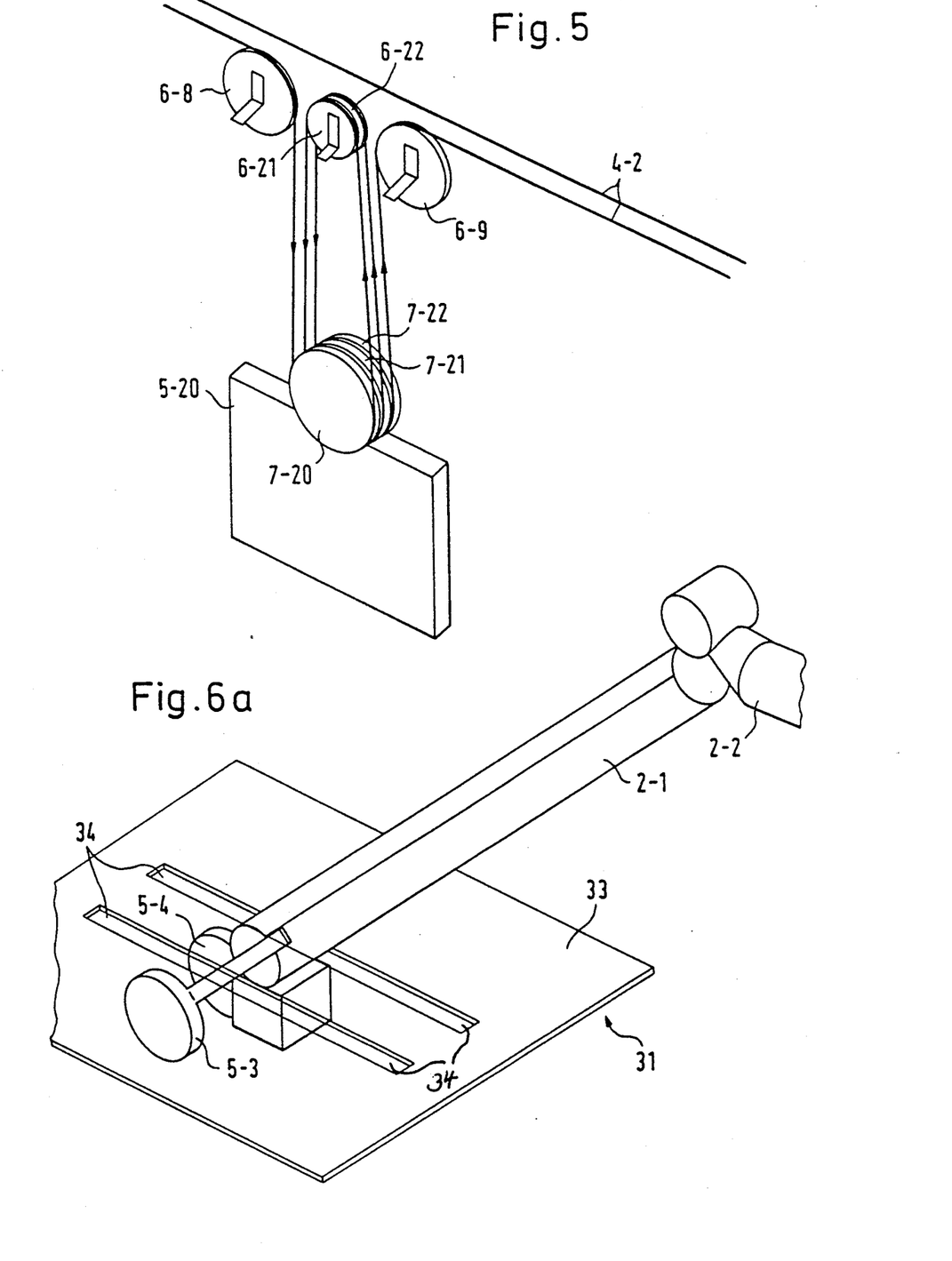
FIG. 5 is a modification of the detail A shown in FIGS. 3 and 4, also in an enlarged view.
FIG. 6a is an enlarged view of the detail indicated with D in FIG. 3.

As illustrated in FIG. 5, it is possible to provide on counterweights, for example counterweight 5-20, a plurality of loose rollers 7-20 to 7-22 instead of a single deflection roller. It is required in this case to provide two additional deflection rollers 6-21 and 6-22, seated parallel to the x-axis; the counterweight 5-20 then must be of corresponding size. The disadvantage of the increased mass of the counterweight 5-20 is compensated in that a shorter displacement path in the z-direction and reduced acceleration is attained with the counterweights provided with a plurality of deflection rollers.

In place of the counterweights 5-1, 5-2 or 5-20 and in place of the ropes 4-1 and 4-2 it is also possible in accordance with a preferred improvement of the device of the invention to fix rope winches, not shown in detail, to the respective carriages 8-1 or 8-2, from which ropes corresponding to the ropes 4-1 and 4-2 are run directly to the respective linkage points on the individual segments. It is also possible to fasten rope winches, displaceable in a controlled manner in the direction of the y-axis, on the support frames 10, in which case ropes corresponding to the ropes 4-1 and 4-2 are run over the drums of the respective rope winches. In accordance with a further preferred embodiment of the invention, it is possible to affect the dynamics of the simulation device in accordance with the invention to move the counterweights 5-1 or 5-2 and/or one or both carriages 8-1 and 8-2 by means of appropriate drives.

In FIG. 6a a steering drive, not shown in detail, for the segment 2-1 is directly relieved by counterweights 5-3 or 5-4, where the two counterweights 5-3 and 5-4 are fastened on different sides of the segment 2-1 directly on the side facing away from the segment 2-1 of a rotary shaft, not indicated in detail. Two parallel cutouts 34 extending in the y-direction are formed in the false bottom 33 so as not to impair the ability to pivot of the segment 2-1.

Figure 6B:
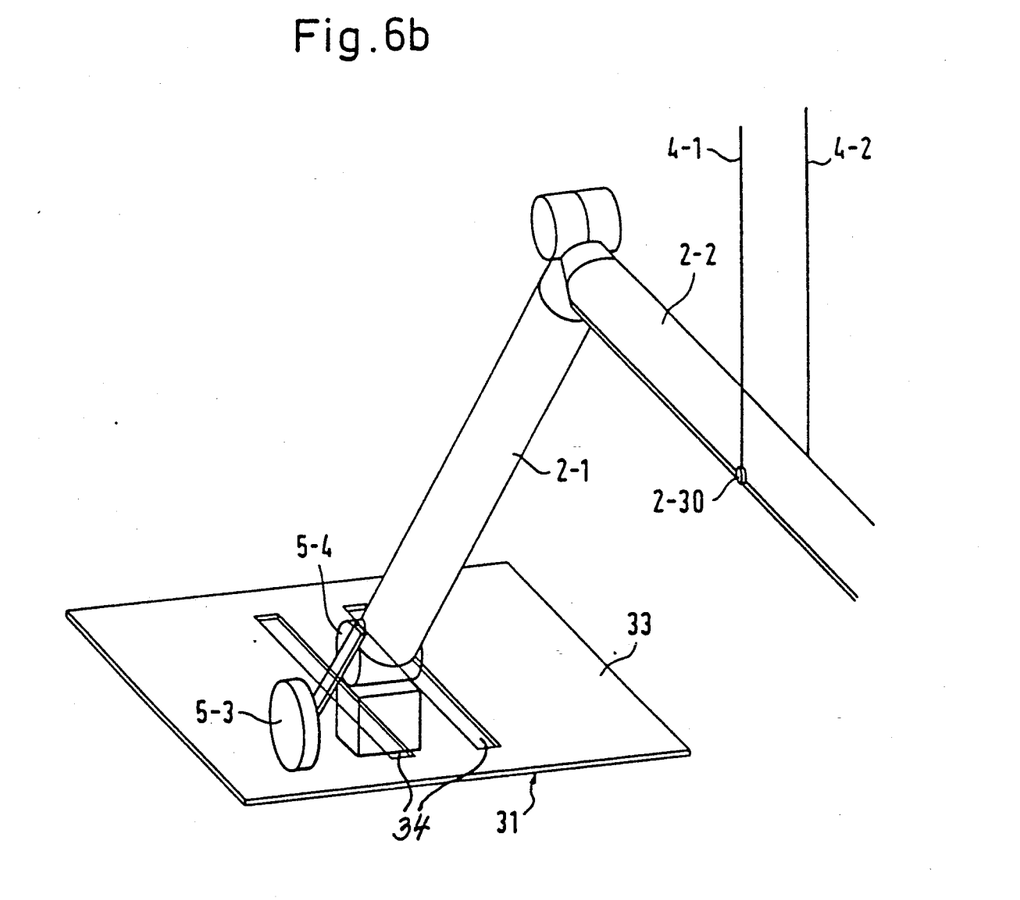
FIG. 6b is a view corresponding to FIG. 6a with a preferred linkage of two support ropes to a manipulator segment.

In respect to the fundamental structure, FIG. 6b essentially corresponds to FIG. 6a. However, in contrast to the embodiments so far described and shown by way of example in FIGS. 1, 2a and 3, in the preferred embodiment in accordance with FIG. 6a the two ropes 4-1 and 4-2 are disposed on two different sides of one and the same manipulator segment 2-2, preferably on actively or passively displaceable linkage points 2-30.

Thus, in accordance with the basic idea of the device of the invention, a segmental weight relief of only one or of individual manipulator segments 2-2 or 2-2 and 2-3 by a rope suspension is provided in such a way that, as already described above by means of FIGS. 1 to 3, the respective ropes 4-1 and 4-2 are fastened laterally offset in respect to the respective individual center of gravity of the manipulator segment 2-2 or 2-3 which is to be relieved. This means that the rope suspension is displaced in respect to a segment center of gravity located in the yz-plane in opposite directions, preferably in the x-axis. By means of this, construction neutralization of the moments caused by the force of weight of the individual segment sections around the joint axes, not indicated in detail, and parallel to the x-axis of the corresponding manipulator segments has been attained. In case of non-supported or suspended segments of a manipulator, these moments would have to be provided by the individual segment drives.

If, as in the illustrations of FIGS. 1 to 4, two segments each are relieved by an appropriate rope suspension, it has been attained by means of the above described rope linkage laterally offset in the x-direction, that almost the entire kinematics of the manipulator 2, which is to be simulated, is reproducable. However, as also already explained above, it is required that the two linkages are located on different sides of the yz-plane formed by the respective longitudinal segment axis.

A collision between manipulator segments and, for example, the ropes 4-1 and 4-2 attached to the various segments, such as segments 2-2 and 2-3, is possible only if the space formed between the planes parallel to the yz-plane, in which the respectively two ropes 4-1 or 4-2 are located, is vacated. It is possible to appropriately enlarge the space between the two yz-planes in which the ropes 4-1 and 4-2 are located by means of a greater lateral offset of the linkage points on the individual manipulator segments, for example segments 2-2 and 2-3, further outward in the direction of the x-axis, i.e. by means of a correspondingly greater eccentricity. Because of this, the probability of interference or even collision of the manipulator 2 because of or with the ropes 4-1 or 4-2 is reduced.

Figure 7:
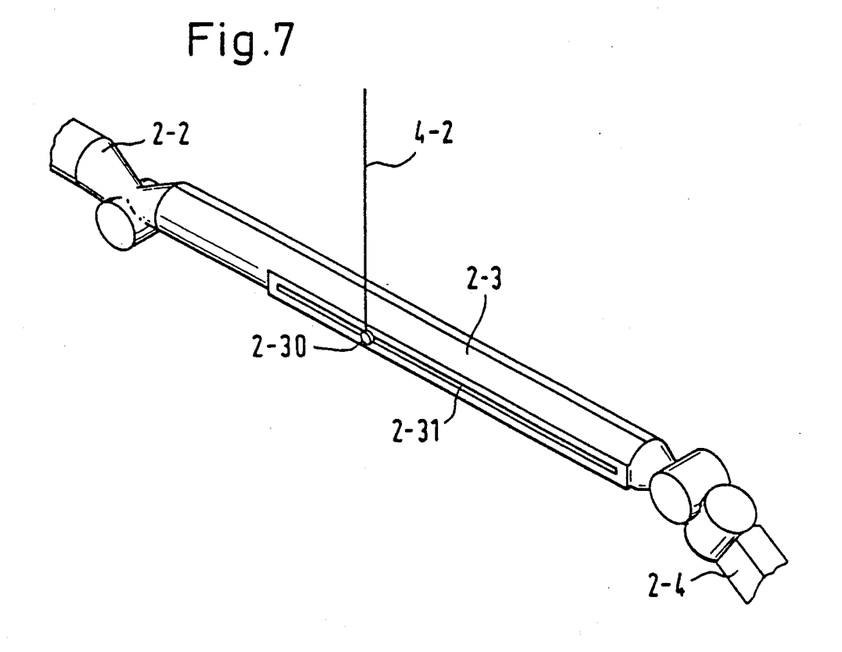
FIG. 7 is an enlarged view of the detail indicated with E in FIG. 3.

The above described rope linkage, laterally offset in respect to the respective center of gravity of the segment, can take place as indicated in FIGS. 1, 2a and 3 either rigidly or, as shown in FIG. 7, by means of a linkage point 2-30 displaceable in the longitudinal direction of a segment, for example the segment 2-3. Such displacement is performed in the course of the manipulator operation by means of a controlled actuator, not shown in detail. Such a controlled, variable linkage is particularly advantageous and practical if further segments which have not been weight-relieved, for example the segment 2-4, follow the manipulator segment to be relieved, for example segment 2-3. In this case it is possible to adjust the linkage point 2-30 to the total center of gravity, which is changing because of the movements of the manipulator, of the last relieved segment, for example segment 2-3, and the subsequent segments which are not individually supported. This means that the y-coordinates of, for example, the linkage point 2-30, and of the total center of gravity of the respective segment, for example segment 2-3 etc., are made to coincide. By means of this mechanism, the complete relief of the joint drive of the last, linked manipulator segment, for example 2-3, is completely independent of the actual configuration of the subsequent, no longer supported manipulator section.

Figure 8:
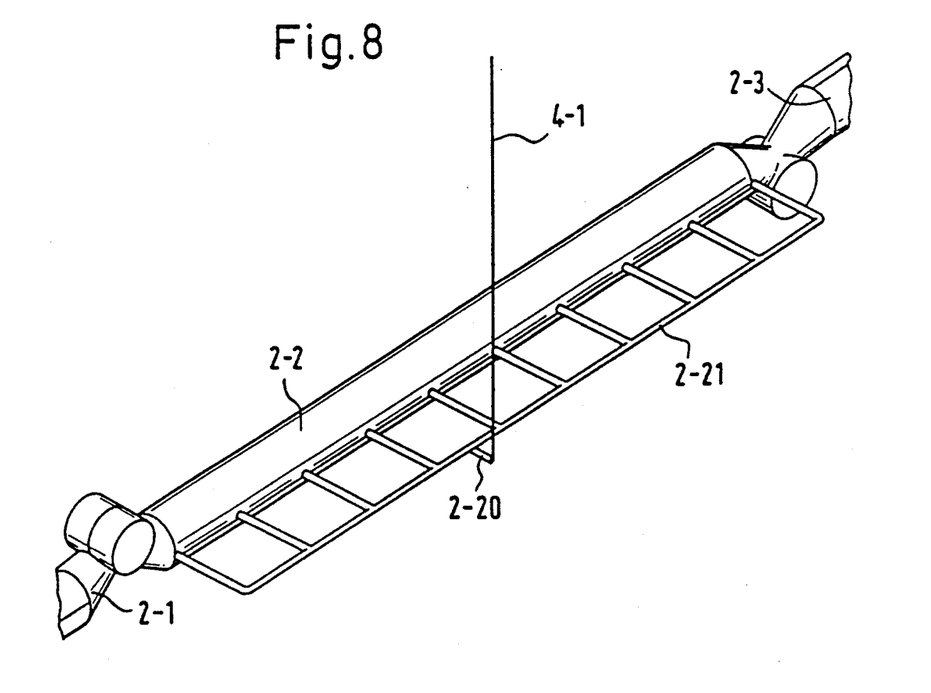
FIG. 8 is a modification of the detail of FIG. 7, also in an enlarged view.

A modification of an eccentric rope linkage for structurally particularly weak manipulators which, for example, correspond to the original flight hardware, is shown in FIG. 8, wherein for example the manipulator segment 2-2 is stiffened by means of a comb-like support element 2-21, fixed at a plurality of points. The rope linkage again takes place laterally offset in respect to the center of gravity of the segment, i.e. laterally offset in the direction of the x-axis at a linkage point 2-20.

A further embodiment of the device in accordance with the invention in respect to the rope guidance and the disposition of counterweights is illustrated in FIG. 10. In contrast to the embodiment of the invention described by means of FIGS. 1 to 9, two rope sections 4-10 and 4-11 or 4-20 and 4-21 are assigned to each manipulator segment 2-2 and 2-3. In this case the rope section 4-10 is run over the deflection roller 6-1, rotatably supported on the carriage 8-1, and over a further deflection roller 6-11, rotatably supported preferably at the ends of the support frames 10, and is fastened with its free end on a counterweight 5-5. The second rope section 4-11 is fastened with one end on the carriage 8-1, guided over a deflection roller 6-13 which is rotatably supported on the other ends of the support frames 10 in relation to the deflection roller 6-11 and is fastened with its other end on a counterweight 5-7. In a corresponding manner, the rope section 4-20 is run over the deflection roller 6-6, rotatably supported on the carriage 8-2, as well as over the deflection roller 6-12, rotatably supported on the left end of the support frame 10 in FIG. 10, and is fastened with its free end on a counterweight 5-6. The second rope section 4-21 is fastened with one end on the carriage 8-2, guided over the deflection roller 6-14, rotatably supported in the vicinity of the deflection roller 6-13, and fastened with the other end on a counterweight 5-8.

Because of the direct fastening of the rope sections 4-11 and 4-21 on the carriage 8-1 or 8-2, which are displaceable in the direction of the y-axis, and because of the guidance of the rope sections 4-11 and 4-21 over the deflection rollers 6-13 or 6-14, as well as their fastening on the respective counterweights 57 or 5-8, a static equilibrium in the direction of the y-axes of the carriages 8-1 or 8-2 is attained, if the masses of the counterweights 5-5 to 5-8 approximately correspond to the mass of the manipulator segments which are to be relieved in each case, for example 2-2 and 2-3. As already described in connection with the counterweights 5-1 to 5-4, the counterweights 5-5 to 5-8 can be replaced by controlled stationary rope winches.

In this connection the essential difference between these two embodiments of the device in accordance with the invention consists in that in the above described embodiment the mechanism required for relieving a segment, such as segment linkage point, rope sections, deflection rollers, as well as the centers of gravity of the counterweights, etc., are located in one plane.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A device for the ground-based simulation of operations of a manipulator usable as a mock-up of a space vehicle movable in the direction of or around the three axes, x, y, and z, of an orthogonal coordination system comprising
    a horizontally disposed support frame including
        first and second rails extending in the y direction;
        first and second movable carriages movable respectively on said first and second rails;
        first and second deflection rollers mounted respectively on said first and second movable carriages;
        first and second ropes guided respectively over said first and second deflection rollers;
        a manipulator as a mock-up of a space vehicle having a base and at least first and second segments attached thereto;
    said first and second ropes each having one end respectively connected to said first and second segments at a position laterally offset with respect to the respective longitudinal axis and the respective center of gravity of each of said segments and directly under said deflection roller supporting said first and second ropes respectively;
    additional deflection rollers supporting each of said ropes;
    a counterweight connected to each of said first and second ropes at a position on said rope after it has been guided over at least one of said additional deflection rollers supporting that said rope;
    said counterweight having a weight approximately twice the weight of said segment to which said rope connects said counterweight;
    a module having a means for connection to said manipulator;
    said base of said manipulator connectable to said module;
    said means for connection of said module to said manipulator including a drive system for movement of said manipulator about said module in a rotation about the z axis extending through said base of said manipulator.

2. A device in accordance with claim 1 wherein at least one of said first and second segments has its weight compensated via one of said ropes;

a third segment of said manipulator is connected to one of said first and second segments;

an at least one counterweight is positioned on said third segment to counterbalance said third segment and is located on the side of said third segment away from its connection to either of said first and second segments.

3. A device in accordance with claim 1 wherein a horizontally extending ceiling has said support frame affixed to said ceiling.

4. A device in accordance with claim 1 wherein a support structure rotatably supports said support frame positioned above said manipulator rotatable about the z axis.

5. A device in accordance with claim 1 wherein a grid structure supports said support frame for rotational movement of an assembly consisting of said support frame, said grid structure, with said manipulator rotatable around the z axis relative to said module.

6. A device for the ground-based simulation of operations of a manipulator usable as a mock-up of a space vehicle movable in the direction of or around the three axes, x, y, and z, of an orthogonal coordination system comprising a horizontally disposed support frame including
first and second rails extending in the y direction;
first and second movable carriages movable respectively on said first and second rails;
first and second deflection rollers mounted respectively on said first and second movable carriages;
first and second ropes guided respectively over said first and second deflection rollers;
a manipulator as a mock-up of a space vehicle having a base and at least first and second segments attached thereto;

said first and second ropes each having one end respectively connected to said first and second segments at a position laterally offset with respect to the respective longitudinal axis and the respective center of gravity of each of said segments and directly under said deflection roller supporting said first and second ropes respectively;

third and fourth deflection rollers at one end of each of said rails respectively supporting said first and second ropes;

first and second counterweights connected to each of said first and second ropes at a position on said rope after it has been guided over said third and fourth deflection rollers respectively supporting that said rope;

said counterweights each having a weight approximately the weight of said segment to which said rope connects said counterweight;

fifth and sixth deflection rollers on the other end of said rails;

third and fourth ropes each having one end respectively connected to said first and second movable carriages and supported by said fifth and sixth deflection rollers respectively;

third and fourth counterweights each approximately equal in weight to said first and second counterweights respectively, connected to said third and fourth ropes respectively on the opposite ends from the connection of said ropes to said movable carriages whereby static equilibrium of said carriages is maintained;

a module having a means for connection to said manipulator;

said base of said manipulator connectible to said module;

said means for connection of said module to said manipulator including
a drive system for movement of said manipulator about said module in a rotation about the z axis extending through said base of said manipulator.

7. A device in accordance with claim 6 wherein a third segment is attached to said second segment without counterbalance by a counterweight;

a linkage point to said rope is attached to said second segment and is offset from the longitudinal axis of said second segment;

an actuator actively displaces said linkage point to bring into coincidence the y coordinate of the total center of gravity of said second segment and the center of gravity of said segment not counterbalanced.

8. A device in accordance with claim 7 wherein additional segments not counterbalanced extend longitudinally from said segments attached to said counterweights.

9. A device in accordance with claim 1 wherein a comb-like support element is fixed to each of said segments which is attached to said ropes, at a plurality of points on said segments.

10. A device in accordance with claim 9 wherein a plurality of loose rollers are attached to each of said counterweights and each of said plurality of loose rollers is supported by one of said ropes.

11. A device for the ground-based simulation of operations of a manipulator usable as a mock-up of a space vehicle movable in the direction of or around the three axes, x, y, and z, of an orthogonal coordination system comprising a horizontally disposed support frame including
first and second rails extending in the y direction;
first and second movable carriages movable respectively on said first and second rails;
first and second deflection rollers mounted respectively on said first and second movable carriages;
first and second ropes guided respectively over said first and second deflection rollers;
a manipulator as a mock-up of a space vehicle having a base and at least first and second segments attached thereto;

said first and second ropes each having one end respectively connected to the same one of said segments at a position laterally offset with respect to the respective longitudinal axis on both sides of said segment and substantially at the center of gravity of said segment directly under said deflection rollers supporting said first and second ropes respectively whereby a torsion or bending moment occurring with eccentric linkage is prevented;

a counterweight connected to each of said first and second ropes;

a module having a means for connection to said manipulator;

said base of said manipulator connectible to said module;

said means for connection of said module to said manipulator including
- a drive system for movement of said manipulator about said module in a rotation about the z axis extending through said base of said manipulator.

12. A device in accordance with claim 11 wherein
a plurality of loose rollers are attached to each of said counterweights and each of said plurality of loose rollers is supported by one of said ropes.

13. A device in accordance with claim 11 wherein
at least one of said first and second segments has its weight compensated via one of said ropes;

a third segment of said manipulator is connected to one of said first and second segments;

an at least one counterweight is positioned on said third segment to counterbalance said third segment and is located on the side of said third segment away from its connection to either of said first and second segments.

14. A device in accordance with claim 1 wherein
a slotted groove extends along at least one side of one of said segments and said rope attached to said segment is slidingly attached to said segment with its end movable along said groove.

15. A device in accordance with claim 1 wherein
said movable carriages are U-shaped with the top portion of each said carriage slidingly connected to slide along said rail.

16. A device in accordance with claim 15 wherein
said rails are combined into a U-shaped beam having lips opening upward; and said movable carriages slidingly move along said upturned lips of said U-shaped beam.

17. A device in accordance with claim 6 wherein
a slotted groove extends along at least one side of one of said segments and said rope attached to said segment is slidingly attached to said segment with its end movable along said groove.

18. A device in accordance with claim 6 wherein
said movable carriages are U-shaped with the top portion of each said carriage slidingly connected to slide along said rail.

19. A device in accordance with claim 18 wherein
said rails are combined into a U-shaped beam having lips opening upward; and said movable carriages slidingly move along said upturned lips of said U-shaped beam.

* * * * *